(No Model.)
J. A. GILLIAM.
PIPE JOINT.
No. 396,080. Patented Jan. 15, 1889.
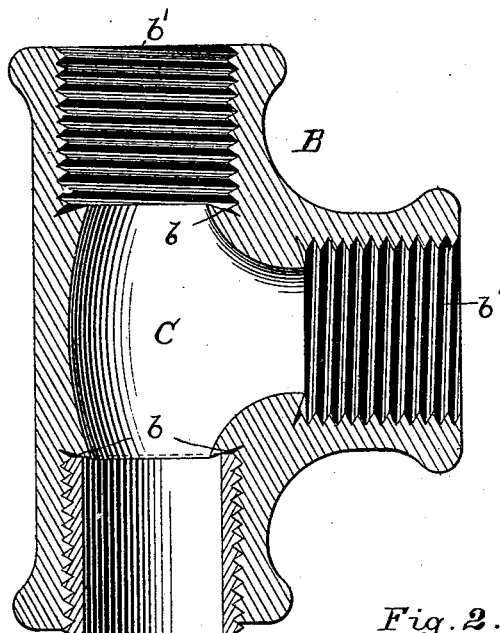
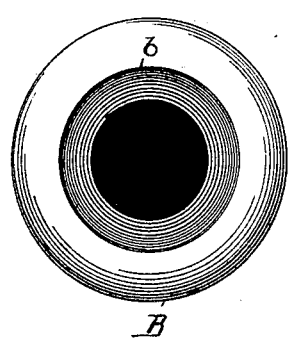
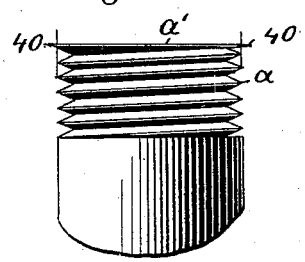
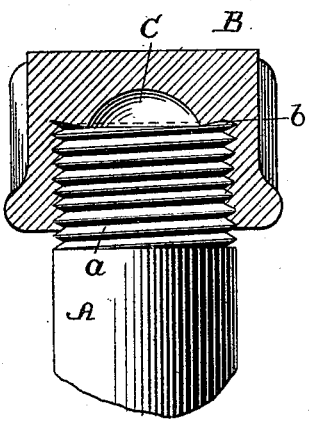
Witnesses
F. G. Fischer
A. Mason
Inventor
John A. Gilliam
By J. V. Higdon
Attorney.

UNITED STATES PATENT OFFICE.

JOHN A. GILLIAM, OF KANSAS CITY, MISSOURI.

PIPE-JOINT.

SPECIFICATION forming part of Letters Patent No. 396,080, dated January 15, 1889.

Application filed February 14, 1888. Serial No. 263,937. (No model.)

*To all whom it may concern:*

Be it known that I, JOHN A. GILLIAM, of Kansas City, Jackson county, Missouri, have invented a new and useful Improvement in Pipe Joints or Connections, of which the following is a full, clear, and exact description, reference being had to the accompanying drawings, forming a part hereof.

My invention relates to means for making a tight connection in pipes and similar devices; and it consists, essentially, of a screw-threaded section in combination with an inclined or beveled shoulder which spreads the end of the pipe when it is screwed down against the shoulder.

In the drawings, which illustrate the manner of carrying out my invention, Figure 1 represents a longitudinal sectional view of a pipe-joint constructed after my invention. Fig. 2 is a detail view illustrating the action of the device. Fig. 3 represents a modified form of the device; and Fig. 4 is an end view of the device, looking into the opening in which the pipe is screwed.

A indicates an ordinary steam or gas pipe having thread $a$ at its end, said end being cut off square in any ordinary way.

B indicates a casting for the pipe-coupling, which may be made in any desired shape for the use it is to be put to—that is to say, it can be in the form of either a straight coupling, an elbow, a T, as shown in Fig. 1, or cap, as shown in Fig. 3.

Formed integral with this casting, upon its interior, is an annular projection, C, the end or ends $b$ of which are beveled or inclined, so as to spread outwardly the end of the pipe A when it is forcibly brought into contact therewith. This operation is more clearly illustrated in Fig. 2, where $a'$ indicates the end of the pipe, and 40 the threads thereof expanded outwardly, as they will be by forcible contact with the shoulder during operation.

The action of this construction is as follows: When the pipe A is screwed within the casting, its end $a'$ comes in contact with the internally-projecting and inclined shoulder $b$, and as the pipe is screwed farther in said end $a'$ will be expanded and the threads at the extreme end of the pipe will be quite forcibly brought into contact with the threads $b'$ within the casting, making a joint that will be much tighter and more secure than would be obtained were such construction not made use of. The internally-projecting shoulder $b$ also forms a sort of pocket for the reception and permanent retention of red lead or other similar material, which is much to be desired. When the pipe is firmly screwed up against said shoulder, it also makes a very tight joint between the extreme end $a'$ and the inclined shoulder $b$.

Having thus described my invention, what I claim is—

A metal pipe-connection having an internal screw-threaded recess, the end walls of which are inclined from the bottom of the recess toward the end of the connection, and being of a diameter greater than that of the threads, in combination with an externally-threaded pipe adapted to enter said metal pipe-connection and be expanded by said end walls to fill said recess, in the manner and for the purpose substantially as described.

In testimony whereof I affix my signature in presence of two witnesses.

JOHN A. GILLIAM.

Witnesses:
S. S. MOREHOUSE,
F. G. FISCHER.